(12) United States Patent
Smith et al.

(10) Patent No.: US 8,712,950 B2
(45) Date of Patent: Apr. 29, 2014

(54) RESOURCE CAPACITY MONITORING AND REPORTING

(75) Inventors: Gregory Lincoln Smith, Seattle, WA (US); Christopher Michael Mitchell, Seattle, WA (US); Smiral Shah, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 363 days.

(21) Appl. No.: 12/769,979

(22) Filed: Apr. 29, 2010

(65) Prior Publication Data
US 2011/0270795 A1 Nov. 3, 2011

(51) Int. Cl.
*G06F 9/44* (2006.01)

(52) U.S. Cl.
USPC .......................................................... 706/52

(58) Field of Classification Search
USPC ................................................. 709/220–226
See application file for complete search history.

(56) References Cited

U.S. PATENT DOCUMENTS

| | | | | |
|---|---|---|---|---|
| 5,884,037 | A * | 3/1999 | Aras et al. ...................... | 709/226 |
| 6,516,348 | B1 | 2/2003 | MacFarlane .................. | 709/224 |
| 6,574,587 | B2 * | 6/2003 | Waclawski ..................... | 702/186 |
| 6,898,564 | B1 * | 5/2005 | Odhner et al. .................. | 703/21 |
| 7,171,668 | B2 | 1/2007 | Molloy et al. ................ | 718/105 |
| 7,308,687 | B2 * | 12/2007 | Trossman et al. ............. | 718/104 |
| 7,313,620 | B2 | 12/2007 | Odhner et al. ................ | 709/226 |
| 7,519,705 | B1 * | 4/2009 | Papagiannaki et al. ....... | 709/224 |
| 8,041,808 | B1 * | 10/2011 | Becker .......................... | 709/224 |
| 8,234,229 | B2 * | 7/2012 | Castelli et al. ................. | 706/21 |
| 8,261,278 | B2 * | 9/2012 | Peracha ........................ | 718/104 |
| 2008/0183865 | A1 * | 7/2008 | Appleby et al. .............. | 709/224 |
| 2008/0228459 | A1 | 9/2008 | Jiang et al. ..................... | 703/13 |
| 2009/0157870 | A1 * | 6/2009 | Nakadai ........................ | 709/224 |
| 2009/0300173 | A1 | 12/2009 | Bakman et al. ............... | 709/224 |
| 2010/0271956 | A1 * | 10/2010 | Diwakar et al. .............. | 370/242 |

OTHER PUBLICATIONS

VMWare, Data Collection Guide Capacity Planner 2.6, Dec. 7, 2007.*
VMWare, Capacity Planner Technical FAQ, Jul. 11, 2008.*
Zhu et al, 1000 islands: an integrated approach to resource management for virtualized data centers, 2008, Cluster Computing.*
Crawford et al, eModel: Addressing the Need for a Flexible Modeling Framework in Autonomic Computing, 2002.*
Capacity Planning for Virtualized Microsoft Environments—Published Date: Oct. 28, 2008, http://searchservervirtualization.techtarget.com/tip/0,289483,sid94_gci1336968,00.html.
Service Monitoring for Virtual Desktop Infrastructures—Published Date: 2010 http://www.eginnovations.com/web/vdimonitor-services.htm.

(Continued)

*Primary Examiner* — Jeffrey A Gaffin
*Assistant Examiner* — Mikayla Chubb
(74) *Attorney, Agent, or Firm* — Louise Bowman; Jim Ross; Micky Minhas

(57) ABSTRACT

Embodiments provide capacity estimates for components of a computing environment, but are not so limited. In an embodiment, a computer-implemented method includes using residual capacity estimates and smooth averages to provide point-in-time capacity estimates for resources of a computing environment. In one embodiment, a computing environment includes a capacity manager that can operate under processor control to provide capacity estimates for a collection of resources as part of a capacity monitoring and planning process. Other embodiments are included and available.

19 Claims, 11 Drawing Sheets

(56) References Cited

OTHER PUBLICATIONS

BMC Capacity Management—Published Date: 2009, http://www.xlr8-technologies.com/CMS/admin/Assets/rightstarsystems/assets/data%20sheets/bcm.pdf.

Server Consolidation and Containment with Virtual Infrastructure and Neptuny—Published Date: 2009 http://www.neptuny.com/contenuti/file/VMW_09Q2_SB_Neptuny_P2_R1.pdf.
Capacity Management and Demand Prediction for Next Generation Data Centers—Published Date: Jul. 30, 2007 http://ieeexplore.ieee.org/stamp/stamp.jsp?tp=&arnumber=4279581.

* cited by examiner

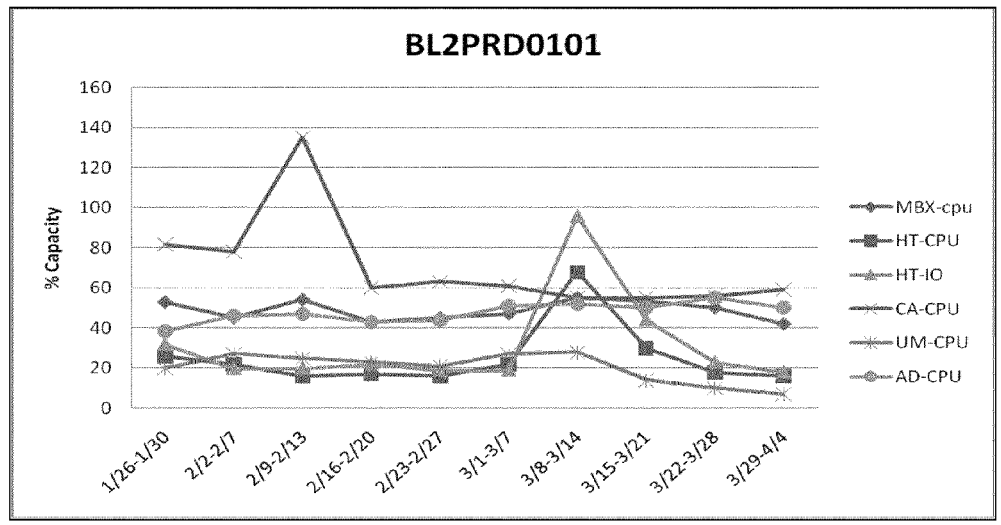
FIGURE 7A
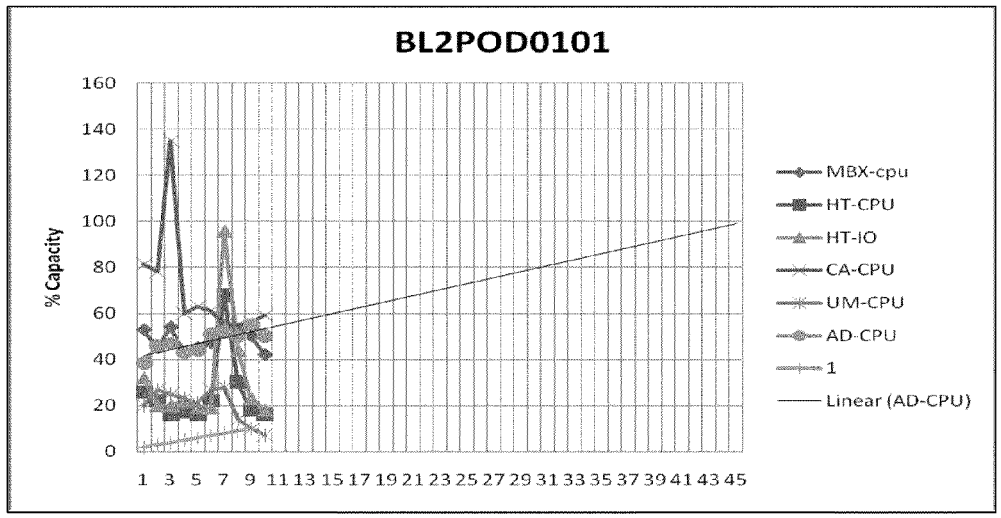
FIGURE 7B
|  | Average Capacity | slope | intercept | weeks until Full | Other |
|---|---|---|---|---|---|
| MBX-cpu | 49 | -0.18 | 49.68 |  |  |
| HT-CPU | 25 | 0.69 | 21.29 | 104 |  |
| HT-IO | 31 | 1.44 | 23.40 | 43 |  |
| CA-CPU | 70 | -4.68 | 96.10 |  |  |
| UM-CPU | 20 | -1.64 | 29.20 |  |  |
| AD-CPU | 48 | 1.30 | 40.50 | 36 |  |
FIGURE 7C

| | Average Capacity | slope | intercept | weeks until Full | Other |
|---|---|---|---|---|---|
| BL2PRD0102 | 74.8 | -3.54 | 94.27 | | |
| DB2PRD0102 | 12.1 | -0.04 | 12.33 | | |
| DB2PRD0101 | 34.1 | 3.63 | 14.13 | 6 | |
| SINPRD0102 | 37.1 | 3.63 | 17.13 | 5 | |
| DB2MGt0101 | 47.9 | 2.50 | 34.13 | 8 | |
| BL2MGT0101 | 43.1 | 2.75 | 28 | 8 | |
| SINMGT0101 | 43 | 1.79 | 33.13 | 19 | |
| SINPRD0101 | 49.9 | 2.48 | 36.27 | 8 | |
| BL2MGT0100 | 50.7 | 3.74 | 30.13 | 1 | |

RESOURCE CAPACITY MONITORING AND REPORTING

BACKGROUND

Capacity planning systems enable system administrators to plan for resource utilization changes based in part on demand for application and other resources. Unanticipated performance and service problems can become common events absent a well-designed capacity planning procedure. Unexpected server downtimes and/or service interruptions adversely impact an organization's efficiency metrics. The steady growth of server-based service architectures requires effective capacity planning procedures to effectuate application services. For example, the complexities associated with a capacity planning procedure compound when implementing resources of a server cluster. Understanding the current capacity and future capacity needs of a server cluster providing software services is a critical part of the planning process associated with large services at scale. A robust capacity monitoring process can assist in allocating capacity at appropriate times to provide high availability, while not over-allocating capacity to maintain efficiencies.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments provide capacity estimates for components of a computing environment, but are not so limited. In an embodiment, a computer-implemented method includes using residual capacity estimates and smooth averages to provide point-in-time capacity estimates for resources of a computing environment. In one embodiment, a computing environment includes a capacity manager that can operate under processor control to provide capacity estimates for a collection of resources as part of a capacity monitoring and planning process. Other embodiments are included and available.

These and other features and advantages will be apparent from a reading of the following detailed description and a review of the associated drawings. It is to be understood that both the foregoing general description and the following detailed description are explanatory only and are not restrictive of the invention as claimed.

BRIEF DESCRIPTION OF THE DRAWINGS

FIGS. 7A-7E depict exemplary graphical interfaces depicting trend estimates for components of a datacenter.

DETAILED DESCRIPTION

Figure 1:
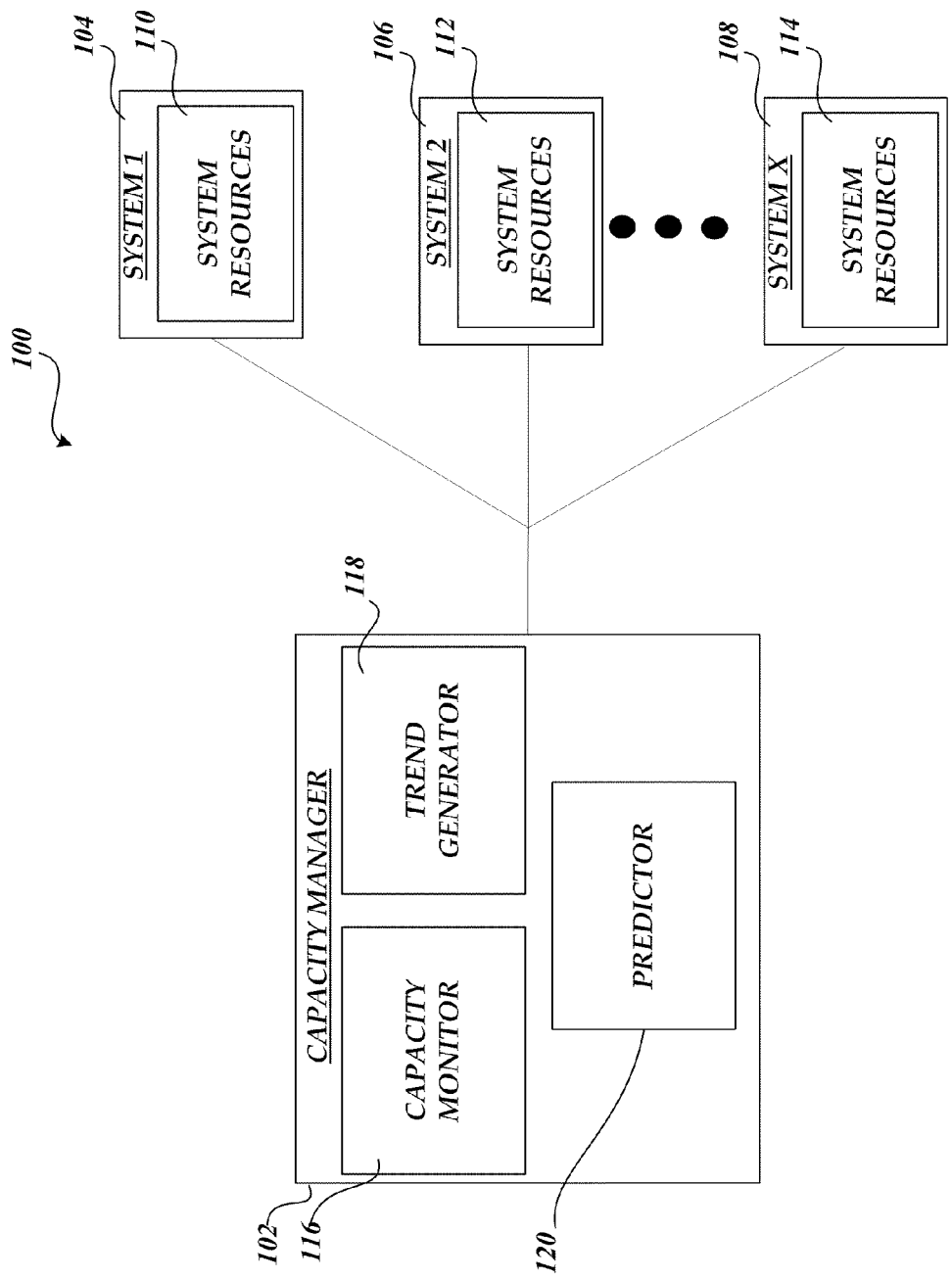
FIG. 1 is a block diagram of an exemplary computing environment.

FIG. 1 is a block diagram of an exemplary computing environment 100. Components of the environment 100 can operate to provide capacity estimates, trending data, and/or predictive data for storage, display, further analysis, and/or use as part of a capacity monitoring and control process, but are not so limited. In one embodiment, the components can operate to provide capacity estimates for capacity trending and/or future capacity predictions based in part on an aggregation of performance metrics, as described further below. As one example, components of the computing environment 100 can collect, sample, and store various performance metrics at regular intervals, as part of determining capacity estimates for capacity planning of select systems of the environment 100.

In one embodiment, components of the environment 100 can be configured to provide system capacity estimates based in part on a maximum utilization of any role/resource in an associated system. For example, a server farm can be monitored for capacity performance as part of determining capacity consumption parameters for projecting future capacity allocations as part of providing application services to a number of clients. In an embodiment, components of the environment 100 can be configured to provide system capacity estimates based in part on some combination of the maximum utilizations and/or some other measure of various resources.

Capacity estimates for one exemplary computer network can be determined in part by querying a central database, either on-demand or on some scheduled basis, to compute a smooth average of select performance metrics over a given time period. The smooth average can be used to calculate point-in-time capacity estimates based in part on maximum capacity values of each system or resource. Daily capacity estimates can be trended over time to produce visual interfaces that indicate capacity estimates over time, as well as a prediction of time to full or some other capacity for each monitored system and/or resource.

As shown in FIG. 1, a capacity manager 102 is communicatively coupled to a number of systems 104-108, each system including system resources 110-114 that include software and hardware components. As described below and in accordance with an embodiment, each resource can be delineated as having various roles as part of quantifying performance tracking parameters of the environment 100. For example, system 104 could include combined system resources 110 including a mail server, a hub server, a client access server, and/or a directory server. Collected tracking parameters, such as performance metrics for all or some combination of the resources, can be used as part of providing capacity estimates of an associated system.

In various embodiments, and described further below, the capacity manager 102 can be configured to provide automated prediction of time (e.g., days, hours, etc.) to capacity for each tracked or monitored resource based in part on the use of statistical techniques to reduce noise introduced into estimates from one-time or irregular events and/or issues. The capacity manager 102 uses a collection of raw performance data across multiple systems to produce an output corresponding to a percentage of capacity consumed for the aggregate of systems and/or system resources. In one embodiment, performance data is automatically collected and/or stored at regular intervals in a dedicated data warehouse or other storage system.

The capacity manager 102 of an embodiment can be configured as a stand-alone component and included as part of a dedicated monitoring platform having processing and memory components and/or additional applications/resources, and/or as part of the functionality of one or more of the systems 104-108. For example, implemented in the computing environment 100, the capacity manager 102 can automatically calculate capacity estimates for monitored server components or resources of a datacenter as part of an implemented capacity plan for the environment 100.

As shown in FIG. 1, the capacity manager 102 of one embodiment includes a capacity estimator or component 116, a trend generator or component 118, and a predictor or component 120. The capacity estimator 116 of an embodiment can operate to provide capacity estimates for each system and/or combinations of systems based in part on a number of performance tracking parameters. For example, the capacity estimator 116 can base a capacity estimate of each system using a result of analyzed performance data (e.g., the largest consumer or most limited resource among the system resources) or as some integration of some combination of the system resources. For example, an expected value can be determined for a combination of system resources at select times (e.g., daily, hourly, etc.) as part of monitoring system performance. The capacity estimator 116 can also provide capacity estimates for the environment 100 as a whole, or based on aggregated subsets of components.

The capacity estimator 116 of one embodiment operates to determine a quantity that is based in part on a smooth averaging process of select performance metrics along with residual capacity measures or values that are associated with a smooth average and an underlying average, but is not so limited. The capacity estimator 116 can output capacity estimates for each system and/or resource based in part on the quantity as adjusted by a predetermined performance quantifier for each performance tracking parameter. For example, depending in part on the system resource, the output quantity for each system resource can be divided by a predetermined capacity maximum for an associated metric, such as a processor consumption metric, a free disk space consumption metric, and/or a communication bandwidth consumption metric, etc.

The trend generator 118 can use the capacity estimates as part of generating trending data for each system and/or system resource. The trend generator 118 operates to provide trending data based in part on the capacity estimates provided by the capacity manager 102. The trend generator 118 of one embodiment uses a linear trending algorithm as part of generating trending data for various systems, taken alone or in some combination. The predictor 120 of one embodiment uses generated trending data and a statistical model as part of providing predictive estimates as to when a particular resource and/or system resource will be at or nearing full capacity, but is not so limited.

As described below, the capacity manager 102 can provide capacity estimates, trending data, and/or predictive data for storage, display, further analysis, and/or use as part of a capacity monitoring and control process, but is not so limited. While a certain number and types of components are described above, it will be appreciated that other numbers and/or types can be included according to various embodiments. Accordingly, component functionality can be further divided and/or combined with other component functionalities according to desired implementations.

Figure 2:
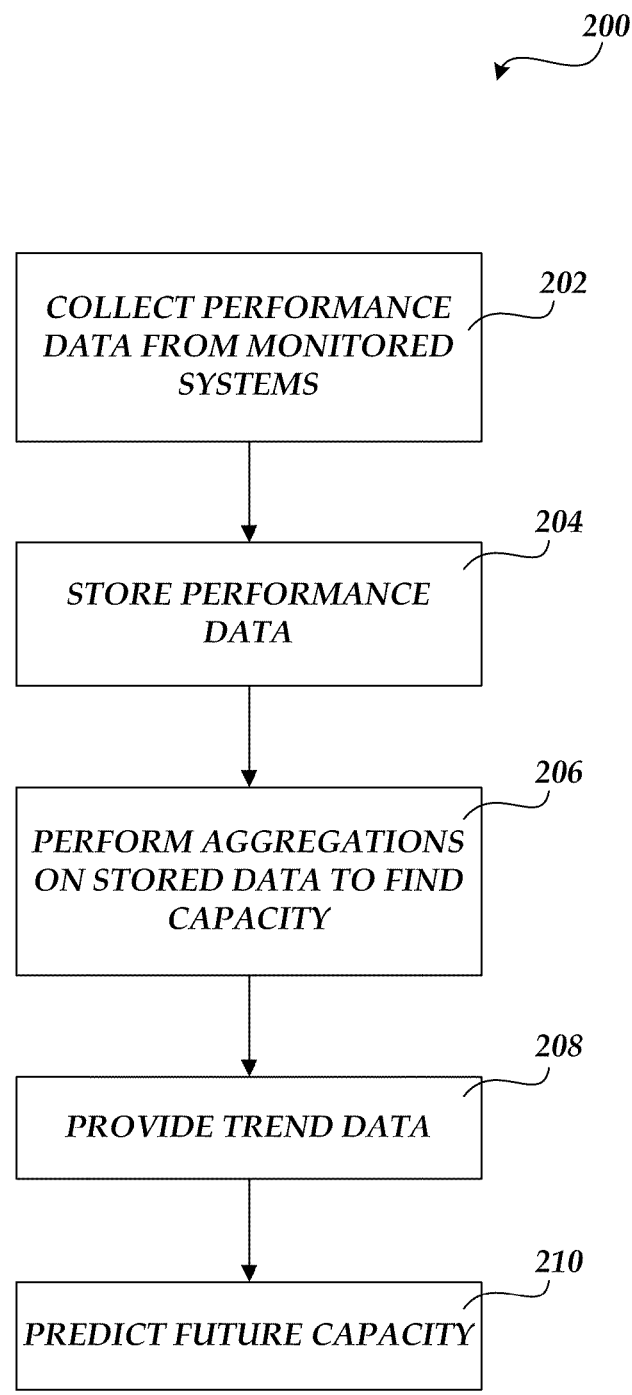
FIG. 2 is a flow diagram illustrating aspects of an exemplary capacity monitoring process.

FIG. 2 is a flow diagram illustrating aspects of an exemplary capacity monitoring process 200. While a certain number and order of operations is described for the exemplary flow of FIG. 2, it will be appreciated that other numbers and/or orders can be used according to desired implementations. The process 200 of an embodiment can be used in part to monitor capacities of datacenter systems, such as server pods or clusters, as part of improving capacity planning operations of a computing environment. The process 200 of one embodiment can operate to monitor each pod or cluster based in part on a number of associated roles. The process 200 can be used to monitor components of the datacenter and project capacity estimates based in part on a statistical analysis of a collection of performance data for various server resources of a cluster.

The process 200 of one embodiment uses performance data associated with processor (e.g., central processing unit (CPU)) consumption parameters, free disk space parameters, Input/Output (I/O) parameters ((I/O) operations per second), page parameters (pages per/sec), and/or amounts of available memory to provide capacity estimates. For example, the process 200 can use perfmon counters to uncover CPU consumption parameters, free disk space parameters, and/or communication bandwidth (e.g., I/O operations/sec), while monitoring pages/sec and/or amounts of available memory for particular servers, such as for client access servers (CAS) and hub servers as examples.

At 202, a data collection component operates to collect performance data from one or more monitored systems which can be used as part of providing capacity estimations. For example, application serving systems automatically collect and/or ship performance data as part of archival and backup features. An integrated monitoring component can collect and validate performance data from a plurality of servers of a datacenter as part of tracking server capacity parameters when trending and providing availability projection analysis. The data collection operations can be implemented for each monitored server to collect instantaneous performance counter measurements (e.g., perfmon values).

In one embodiment, the process 200 uses a data collection component configured to automatically pull or retrieve information from the monitored systems, and/or the systems can be configured to automatically provide performance data to a collection component at certain times or intervals. At 204, the collected data is stored using a dedicated system for long-term storage. For example, the collected data can be stored in a dedicated data warehouse, wherein raw data can be stored for a first time period (e.g., 180 days), and aggregated data can be stored for a second time period (e.g., 400 days). The storage system may use local and/or remote components and include distributed configurations.

At 206, the process 200 uses aggregations of the collected data as part of providing capacity measurement determinations. In one embodiment, the process 200 at 206 uses a capacity estimation component or algorithm to provide capacity estimates based in part on residual values derived from smooth time-ordered average capacity values calculated over a given time. A smooth averaging process of an embodiment can be determined based in part on determining an average of a first subset of values. The first subset can be moved forward to a new subset of values to determine an average for the combination (e.g., the next subset overlaps the first but drops the oldest values and adds corresponding newer values to the calculation). The process is repeated over some time period. Thus, a smooth or moving average can be described as a set of numbers, each of which is the average of the corresponding subset of a larger set of values. A moving average can also use weighting parameters to emphasize particular values.

In one embodiment, capacity estimates for the given time period can be based in part on a first quantity that includes an average of the smooth average values plus a second quantity that includes a standard deviation quantification using the residual values, divided by pre-determined capacity maximums. A capacity report for particular datacenter components can be generated using the capacity estimates. For example, required queries can be run against the data warehouse and the returned data can be aggregated and analyzed to produce capacity based reports.

At 208, the process 200 operates to provide trend data associated with a given datacenter. For example, trend data can be produced by running a single query against stored data grouped by a time period representative of a desirable trend interval. The trend data can be added to an additional report to display a historical trendline of capacity consumption (see, for example, FIG. 3, and FIGS. 6C and 7B). At 210, the process 200 operates to predict future capacity estimates for components of the datacenter. For example, the process 200 can be used to predict or estimate when monitored resources reach full or some threshold capacity.

The process 200 of one embodiment uses a statistical linear regression method as part of providing a time estimate as to when monitored resources (taken individually or in various combinations) may be at full, near full, or some other capacity. Due in part to the assumption of the sometimes inherent unstable aspects of software systems having constant changes introduced, in accordance with one embodiment, a worst case estimation can be used to predict when a resource is going to be full in conjunction with a standard linear regression analysis. In other embodiments, other estimation models can be used such as: "start of school" adoption steps, exponential growth features, or other estimation processes. In one embodiment, the process 200 can base an optimistic calculation on a slope and intercept of a trend line to determine when a capacity reaches one hundred percent (100%).

That is, $x_{optimistic} = (100-b)/m$, where $m$=slope and $b$=intercept.

A pessimistic calculation can be calculating by:

$x_{pessimistic} = x_{optimistic} - x$, where $\Delta x$ is an amount of uncertainty associated with $x_{optimistic}$.

$\Delta x$ can be calculated as:

$$\Delta x = \sqrt{\left(\frac{\partial x}{\partial b}\Delta b\right)^2 + \left(\frac{\partial x}{\partial m}\Delta m\right)^2}$$

$$\Delta x = \sqrt{\left(\frac{-1}{m}\Delta b\right)^2 + \left(\frac{(b-100)}{m^2}\Delta m\right)^2}$$

The process 200 can also calculate the standard error for the intercept ($\Delta b$) and standard error for slope ($\Delta m$) by:

Standard Error for the Intercept:

$$\Delta b = \sqrt{\frac{1}{n} + \frac{\overline{x}^2}{ss_{xx}}}$$

and,
Standard Error for the Slope:

$$\Delta m = \frac{s}{\sqrt{ss_{xx}}}$$

where, $$s = \sqrt{\frac{ss_{yy} - \frac{(ss_{xy})^2}{ss_{xx}}}{n-2}}$$

$$ss_{xx} = \left(\sum_{i=1}^{n} x_i^2\right) - n\overline{x}^2$$

$$ss_{yy} = \left(\sum_{i=1}^{n} y_i^2\right) - n\overline{y}^2$$

and, $$ss_{xy} = \left(\sum_{i=1}^{n} (x_i)(y_i)\right) - n\overline{xy}.$$

Figure 3:
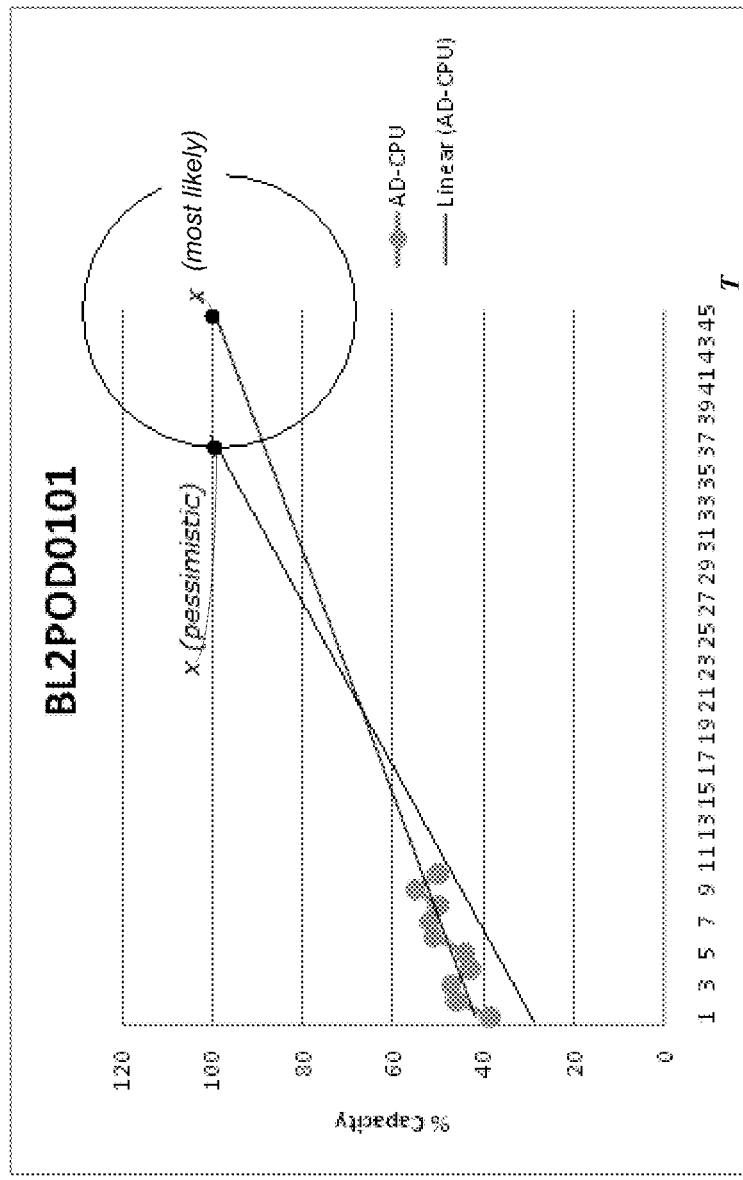
FIG. 3 is a graphical view of calculated optimistic and pessimistic values of an exemplary capacity monitoring process.

FIG. 3 is a graphical view of calculated optimistic and pessimistic values of an exemplary capacity monitor process for a datacenter pod using the above equations. As shown, a pessimistic variable for the pod reaches 100% capacity at about 37 days based in part on the plotted values, whereas an optimistic variable for the pod reaches 100% capacity at about 45 days. Based in part on such an assessment, the capacity planner can use an intermediate curve with adjusted slope and intercept variables to extend capacity usage of a pod or role as long as possible taking into consideration user populations.

Figure 4:
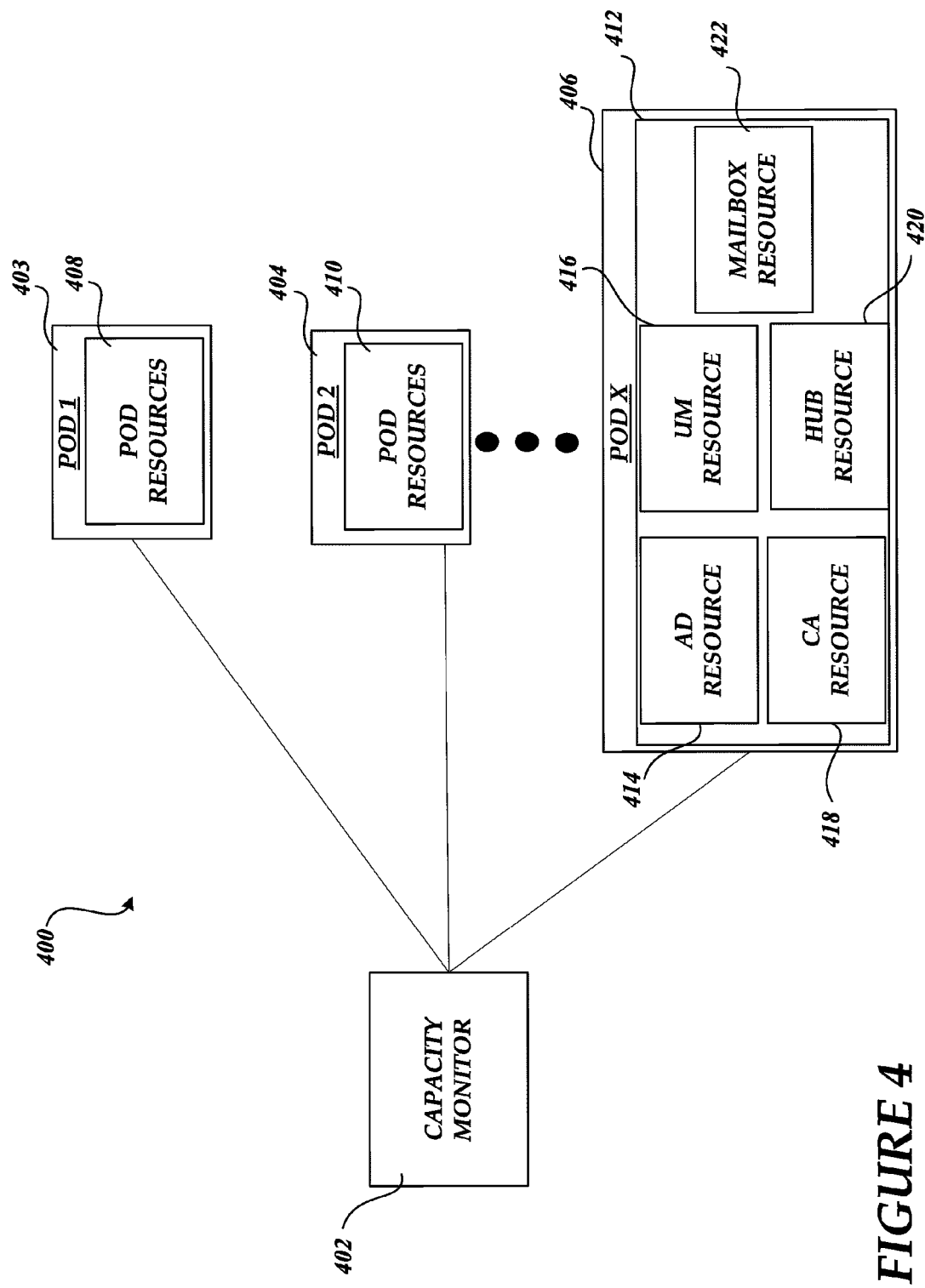
FIG. 4 is a block diagram of an exemplary computing environment.

FIG. 4 is a block diagram of an exemplary computing environment 400. For example, the computing environment 400 can be configured as a datacenter that includes a number of components configured to provide application and other services to communicating clients. As discussed below, the exemplary computing environment 400 includes a capacity monitor 402 in communication with a number of pods 403-406 that include a number of resources 408-412, respectively. It will be appreciated that each pod may include distinct or cumulative resources provisioned for various purposes or services.

As shown, the exemplary pod 406 includes resources 412 having an active directory (AD) role 414, a unified messaging (UM) role 416, a client access server (CAS) role 418, and a hub role 420. In one embodiment, each role can include a corresponding server platform or server, including distinct processing, disk, and memory components. Each server can include multiple roles, such as a server that includes hub and CAS roles. The AD role 414 of one embodiment can be implemented as a distributed, replicated, object database, in which one or more master database copies can be maintained along with a number of database replicas or instances using a data storage schema. The UM role 416 can include functionality to consolidate various messaging and/or communications technologies such as voicemail, email, facsimile, etc.

The CAS role 418 can include functionality to accept connections from various clients, including application clients that use various communication protocols (e.g., POP3, IMAP, etc.), and/or hardware clients, such as portable communication devices that can also communicate using various protocols. The hub role 420 can include functionality to rout communications within the communication environment 400, including handling email flow, application of transport rules, application of journal rules, and/or delivering messages to recipient mailboxes associated with mailbox role 422.

The capacity monitor 402 can operate to provide capacity estimates for each pod of the datacenter 400 based in part on aggregations and a statistical analysis of performance metrics for defined aspects of each role. The capacity monitor 402 can provide capacity estimates as part of providing: an estimate of remaining capacity or availability of an associated pod, limiting role(s) for each pod, and/or trending data to predict when an associated pod will be at full, near-full, or some other capacity.

In one embodiment, performance metrics for each resource track processor consumption or usage, available disk space, disk I/O operations/sec, and/or other performance or tracking parameters. For example, collected data for pages/sec and available memory can be tracked and used in estimating capacity for certain resources of an aggregated system, such as for CAS and hub resources. The capacity monitor 402 can use an aggregation of capacity estimates for the associated resources and a statistical analysis of select performance metrics to provide a capacity estimate for each pod.

As one example, structured query language (SQL) based queries can be run against a datacenter database (e.g., MOM database) as part of producing a daily report of certain performance metrics. The queries and stored procedures can be used in mining the data, including smooth averaging procedures to use in providing capacity estimates. For example, the datacenter database can be configured to contain hourly average values for each performance metric (e.g., perfcounter) of each role, as part of providing fine resolution for the capacity determinations. Performance data can be optimized for use in capacity estimations (e.g., using a System.Diagnostics namespace). Collected performance data for each role can be stored in some dedicated store, such as a central datacenter database, for continuous archive and backup. As an example, as part of determining a pod's capacity, the model can be used to select the "busiest" hour for that counter in an associated role across the entire pod.

Table 1 lists hourly average values for a counter that tracks processor usage (e.g., % CPU values) for four mailbox servers (MBX1-MBX4) of a pod.

TABLE 1

|          | MBX1 | MBX2 | MBX3 | MBX4 | Average |
|----------|------|------|------|------|---------|
| 9:00 AM  | 30   | 80   | 20   | 10   | 35      |
| 10:00 AM | 45   | 45   | 45   | 45   | 45      |
| 11:00 AM | 30   | 30   | 50   | 30   | 35      |
| 12:00 AM | 30   | 25   | 25   | 50   | 33      |
| 1:00 PM  | 50   | 20   | 30   | 30   | 33      |

As shown in Table 1, even though the 10:00 AM hour is not when any of the servers had maximum values, the time corresponds to when the most cycles were being consumed by the pod as a whole, as shown in the average value column. During the performance metric collection periods, the number of concurrent users and/or number of provisioned users is also tracked. To eliminate transient issues (e.g., a denial of service attack) the capacity monitor can operate to average the load over the workweek (e.g., the 5 highest values in the past 7 days). Thus, the capacity monitor can operate in similar fashion to determining a peak hour for the pod (e.g., 10:00 AM) on a given day, by determining a peak hour over the workweek.

In an embodiment, the capacity monitor 402 can be configured to calculate capacity estimates for each role based in part on an estimation algorithm that includes performance metric variables. The capacity monitor 402 can use the role estimates to provide a capacity estimate for an associated pod. For example, the capacity monitor 402 can use performance metrics to obtain capacity estimates for the AD role 414, UM role 416, CAS role 418, and hub role 420, which, in turn, can be used to provide a capacity estimate for pod 406, as shown below for FIGS. 6A-6D.

In one embodiment, average values can be obtained for the performance metrics over a given time period (e.g., days, week, etc.) and used to calculate a smooth or moving average for the performance metrics. A residual capacity or value can be determined for a given point in time based in part on a difference between the average value and the smooth average value for the given point in time. Thus, residual values for each performance metric can be obtained for a given time period (see FIG. 5). The capacity monitor 402 can use smooth average values and residual values to calculate point-in-time capacity calculations for each role, which can be used to determine a capacity estimate for an associated pod.

In one embodiment, the capacity monitor 402 can use the following equation to calculate point-in-time capacity estimates by:

$$\text{estimate} = \frac{Avg(SAV) + (StdDev(R) * 1.96)}{\text{Pre-determined Capacity Maximum}} * 100 \qquad (1)$$

Where,

SAV is the smooth average, and

StdDev (R) is a probabilistic measure associated with a standard deviation of the residual values.

Figure 5:
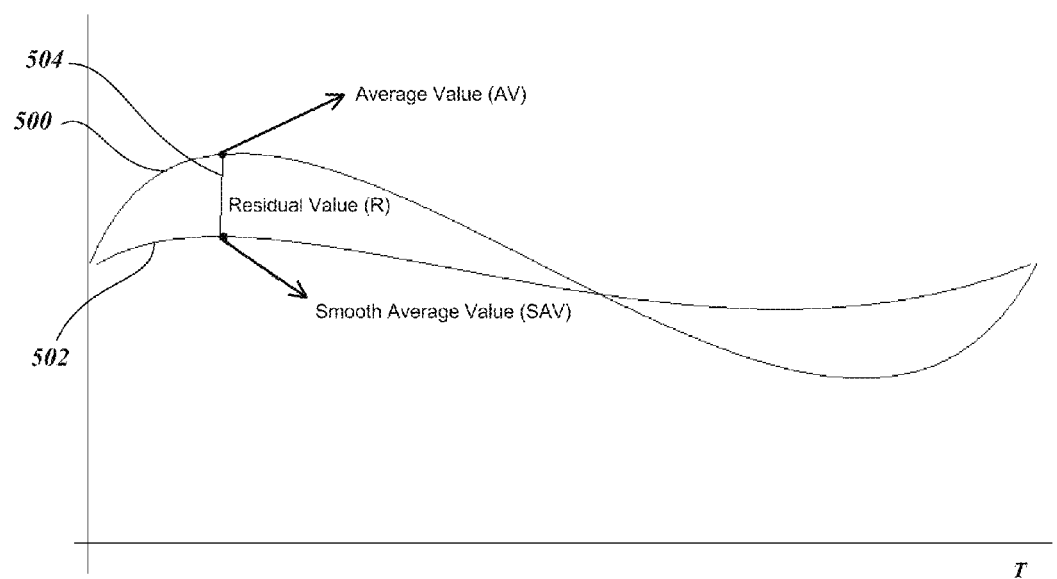
FIG. 5 is a graphical depiction exemplary performance metrics associated with a server role.

FIG. 5 is a graphical depiction of exemplary performance metrics of a server role within a datacenter computing environment. As shown in FIG. 5, the curves include an average curve 500 and a smooth average curve 502 for exemplary performance metrics of the server role. Residual values 504 can be determined based in part on a measure (e.g., coincident point-in-time differences) between curves 500 and 502 as a function of time.

Particularly, equation (1) averages the moving average over a period of time to obtain a single value for the period, adding the 95th percentile of the standard deviation of the residual values to determine a peak value for a point in time if the pre-determined capacity maximum value is 100. However, typical scenarios use less than 100% (e.g., CPU consumption estimates use a calculated constant for capacity maximum of about 70%). Thus, a final capacity estimate can be calculated by dividing the peak value by a pre-determined capacity maximum for the given period. For example, the capacity monitor 402 can use equation (1) to determine an estimated pod capacity based on the maximum capacity consumer of an associated pod.

In one embodiment, role limits or thresholds can be used as part of planning for potential failures. For example, a "full" pod should still be able to handle a failure (e.g., losing one hub will not trigger backpressure, losing one CAS won't prevent users from logging on, etc.).

Table 2 lists a starting point for limits used in planning for potential failures.

TABLE 2

|     | % CPU | % disk Free space | disk IOPS/spindle | Available Memory |
|-----|-------|-------------------|-------------------|------------------|
| CAS | <65%  | >30%              | <50               | >500 MB          |

TABLE 2-continued

|  | % CPU | % disk Free space | disk IOPS/spindle | Available Memory |
|---|---|---|---|---|
| HUB | <65% | >30% | <150 | >500 MB |
| MBX | <50% | >30% | <50 |  |
| AD | <50% | >30% | <50 |  |

For this example, the HUB has 3 spindles of an array, which provides a 3× higher IOPS limit.

FIGS. 6A-6D depict exemplary graphical interfaces that depict capacity estimates for components of a datacenter, such as datacenter 400 for example. The various graphical interfaces can include various presentation information based in part on estimation parameters and display preferences of a capacity estimation period.

Figure 6A:
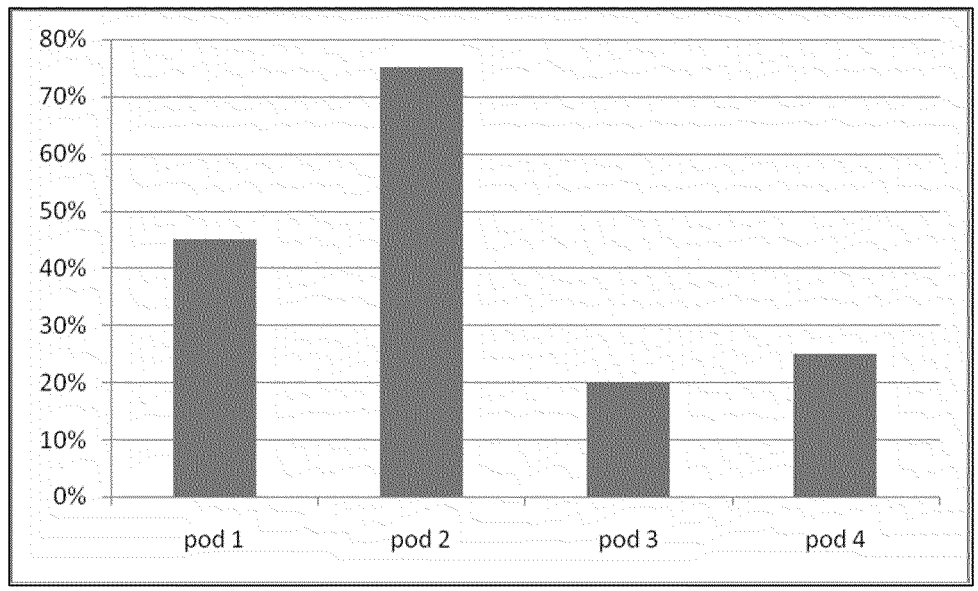
FIGS. 6A-6D depict exemplary graphical interfaces depicting capacity estimates for components of a datacenter.

FIG. 6A depicts an exemplary graphical interface depicting pod capacity estimates provided by capacity monitor 402 that is communicatively monitoring four pods of data center 400 (pod 1, pod 2, pod 3, and pod 4) at a given point in time. In one embodiment, a pod capacity estimate can be based on the resource or role having the maximum usage or utilization for a given capacity estimation period. As shown, for this point in time, pod 2 has an estimated capacity of about 75% corresponding in part to the CAS resource being the greatest capacity consumer with respect to the other resources of pod 2 (FIG. 6B).

Figure 6B:
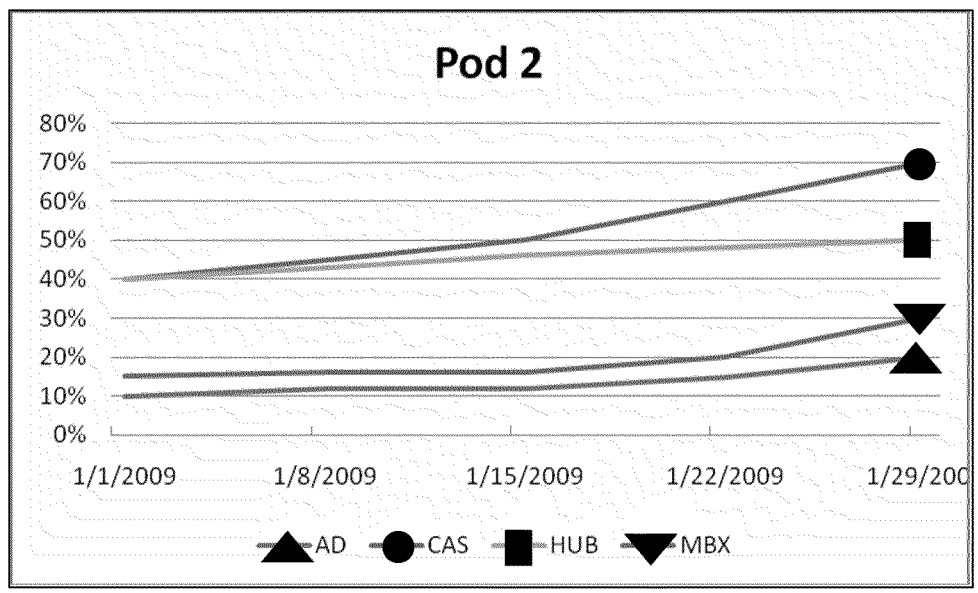

FIG. 6B is an interface depicting resource capacity estimates for the resources of pod 2. The interface can be presented to a user after selecting pod 2 in FIG. 6A (e.g., clicking, touching, etc. the pod 2 bar). As shown in FIG. 6B, pod 2 includes an AD resource, a CAS resource, a HUB resource, and a MBX resource. The capacity estimates for each resource are shown as plot lines and are based in part on equation (1) and the corresponding performance metrics of each resource, as discussed above. As described above, the capacity monitor 402 can provide a capacity estimate for each pod of the datacenter 400 using peak values for the resources during a given period of time.

Figure 6C:
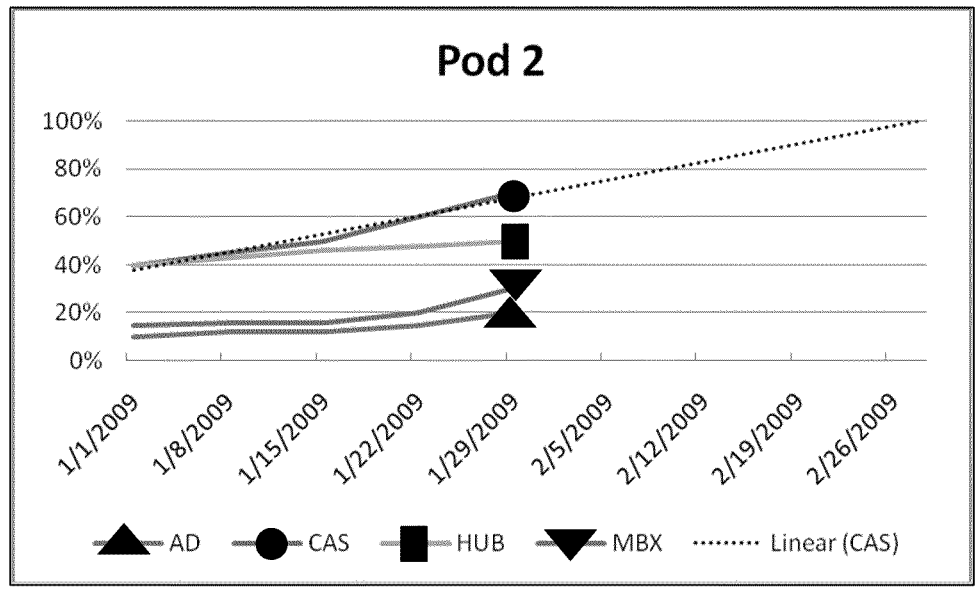

FIG. 6C depicts the plot lines of FIG. 6B including a trend line (TL) that is based in an assumption of linear growth for the CAS resource, which, for this example, is driving capacity consumption of pod 2. A user can select any of the plot lines to get a break down of the performance metrics for the associated resource.

Figure 6D:
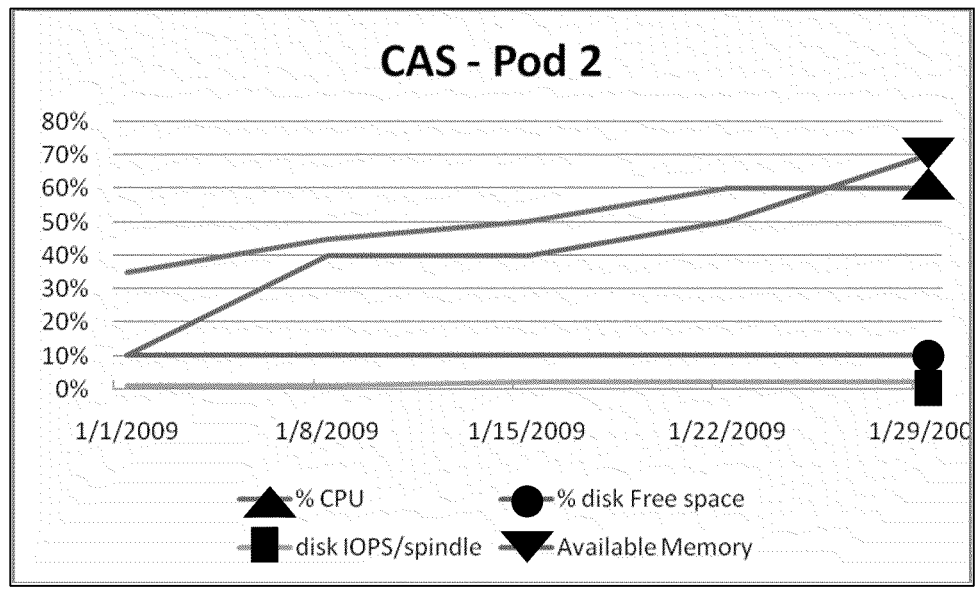

FIG. 6D depicts plot lines for the performance metrics associated with the CAS resource upon selecting the plot line for the CAS resource of FIG. 6C. As shown, % CPU and Available Memory are the main capacity consumers over this time period for the CAS resource of pod 2.

Continuing with the examples above and with reference to FIGS. 7A-7C, trending data can be used as part of determining capacity trends and/or times to some threshold capacity. In one embodiment, a trend generator can be used to generate three levels of trending information, but is not so limited. For this example, the levels include: a datacenter trend level, a pod trend level, and a role trend level.

Figures 7D, 7E:
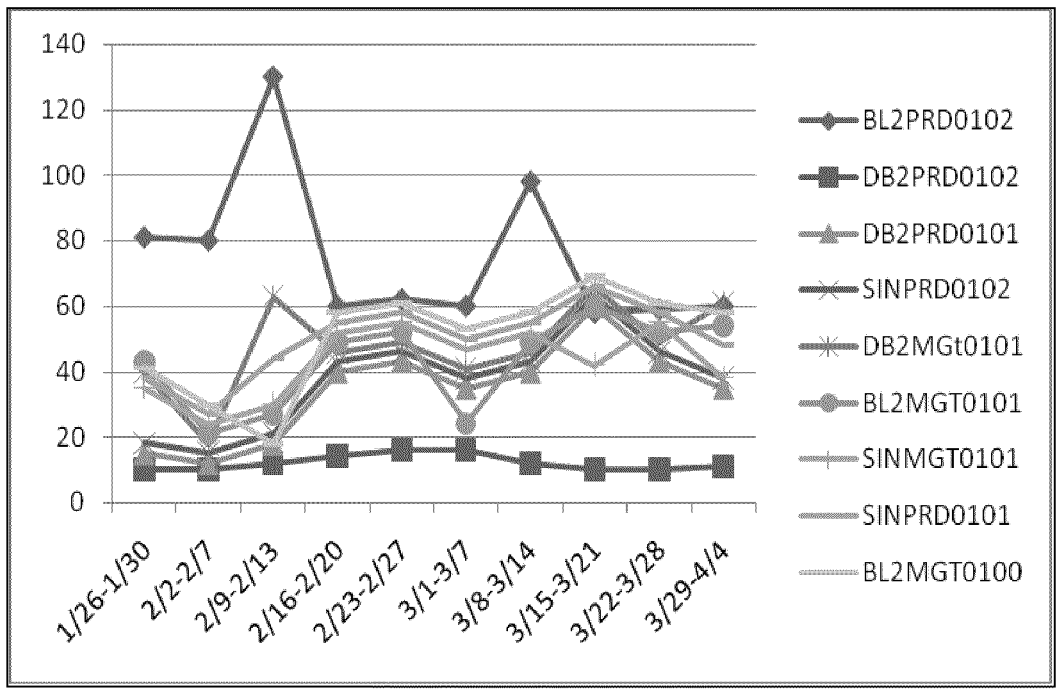

FIGS. 7A-7E depict exemplary graphical interfaces that depict trend estimates for components of the datacenter 400. As shown in FIGS. 7A-7B, trend estimates are provided for each resource, broken out by an associated performance metric. For each pod, a capacity function of each role is shown as a function of time. For this example, one point can be plotted per week for each resource-performance metric pair. Not shown are tracked resources AD-IO and AD-DitSize.

The total capacity trend of an associated pod can be based in part on the highest point value of some time frame or interval. As shown in FIG. 7A, the CAS resource CPU metric is trending to a higher capacity than the other resources for this time period. However, omitting extraneous spikes, HT-IO has the highest peak between the 2/2 and 2/20 time periods. FIG. 7B includes a trendline that provides a higher level view of the trending data.

Alternatively, or additionally, as shown in FIG. 7C, a tabular interface can be presented that includes capacity tracking parameters, shown in part by the exemplary tracking parameters, average capacity, slope, intercept, and weeks until full. It will be appreciated that other parameters can be included, including various tracking categories, periods, differentiators, etc.

In one embodiment, the capacity monitor 402 can determine when each resource and/or role will be at a full capacity based in part on the use of fitting operations to determine a slope value and an intercept value for a trend line as the projected x value when the capacity reaches 100% as:

$$x_{full} = \frac{100 - b}{m},$$

where the uncertainty in x is:

$$\Delta x^2 = \left(\frac{\partial x}{\partial b}\Delta b\right)^2 + \left(\frac{\partial x}{\partial m}\Delta m\right)^2$$

$$\Delta x^2 = \left(\frac{100}{m}\Delta b\right)^2 + \left(\frac{100-b}{m^2}\Delta m\right)^2$$

The uncertainties $\Delta b$ and $\Delta m$ can be determined based in part on the standard error equations described above in reference to FIG. 2. In one embodiment, an interface can include tabular view of $x_{full}$ and $(x_{full} - \Delta x)$, representing "most likely" and "earliest fit" times when an associated pod would be full.

Similar presentation interfaces can be used to provide pod capacity estimates, as shown in FIG. 7D. FIG. 7D depicts one exemplary interface showing capacity estimates for a number of pods of a datacenter. In one embodiment, the capacity monitor 402 provides pod capacity estimates based in part on the maximum utilization of any role in an associated pod, as described above.

FIG. 7E depicts a tabular interface that includes capacity tracking parameters, shown in part by the exemplary tracking parameters, average capacity, slope, intercept, and weeks until full. It will be appreciated that other parameters can be included, including various tracking categories, periods, differentiators, etc. Other embodiments can include other parameters and features.

Figure 8:
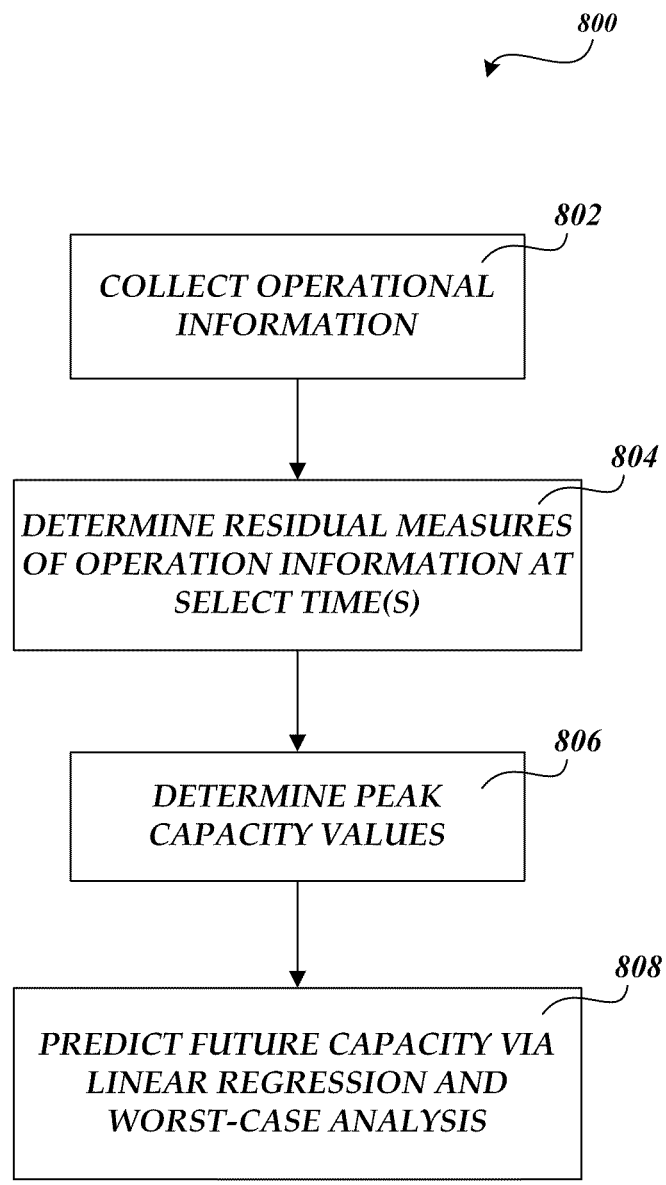
FIG. 8 is a flow diagram illustrating aspects of an exemplary capacity monitoring process.

FIG. 8 is a flow diagram illustrating aspects of an exemplary capacity monitoring process 800. At 802, the process operates to collect operational information associated with a plurality of monitored systems, such as pods of a datacenter for example. The collection of operational information can be updated and/or archived as needed. At 804, the process 800 operates to determine residual measures of the collected information at select times. For example, the process 800 can use a smooth averaging process to determine residual capacity values for a select estimation period.

At 806, the process 800 operates to determine peak capacity values for all or some subset of the monitored systems. For example, a peak capacity value can be calculated by averaging smooth average data over an interval, and adding a standard deviation of the residual measures over this interval as part of determining a point-in-time capacity estimate for a pod, resource, or other component. At 808, the process 800 operates to predict future capacity estimates based in part on a linear regression and worst-case analysis, but is not so limited. Various estimation parameters and other monitoring information can be presented using a computerized display (see FIGS. 7A-7E for example). While a certain number and order of operations is described for the exemplary flow of FIG. 8, it will be appreciated that other numbers and orders can be used according to desired implementations.

Exemplary communication environments for the various embodiments can include the use of secure networks, unsecure networks, hybrid networks, and/or some other network or combination of networks. By way of example, and not limitation, the environment can include wired media such as a wired network or direct-wired connection, and/or wireless media such as acoustic, radio frequency (RF), infrared, and/or other wired and/or wireless media and components. In addition to computing systems, devices, etc., various embodiments can be implemented as a computer process (e.g., a method), an article of manufacture, such as a computer program product or computer readable media, computer readable storage medium, and/or as part of various communication architectures. An exemplary computer program product can include computer storage media that includes useable electronic note taking instructions.

The embodiments and examples described herein are not intended to be limiting and other embodiments are available. Moreover, the components described above can be implemented as part of networked, distributed, and/or other computer-implemented environment. The components can communicate via a wired, wireless, and/or a combination of communication networks. Network components and/or couplings between components of can include any of a type, number, and/or combination of networks and the corresponding network components include, but are not limited to, wide area networks (WANs), local area networks (LANs), metropolitan area networks (MANs), proprietary networks, back-end networks, etc.

Client computing devices/systems and servers can be any type and/or combination of processor-based devices or systems. Additionally, server functionality can include many components and include other servers. Components of the computing environments described in the singular tense may include multiple instances of such components. While certain embodiments include software implementations, they are not so limited and encompass hardware, or mixed hardware/software solutions. Other embodiments and configurations are available.

Exemplary Operating Environment

Figure 9:
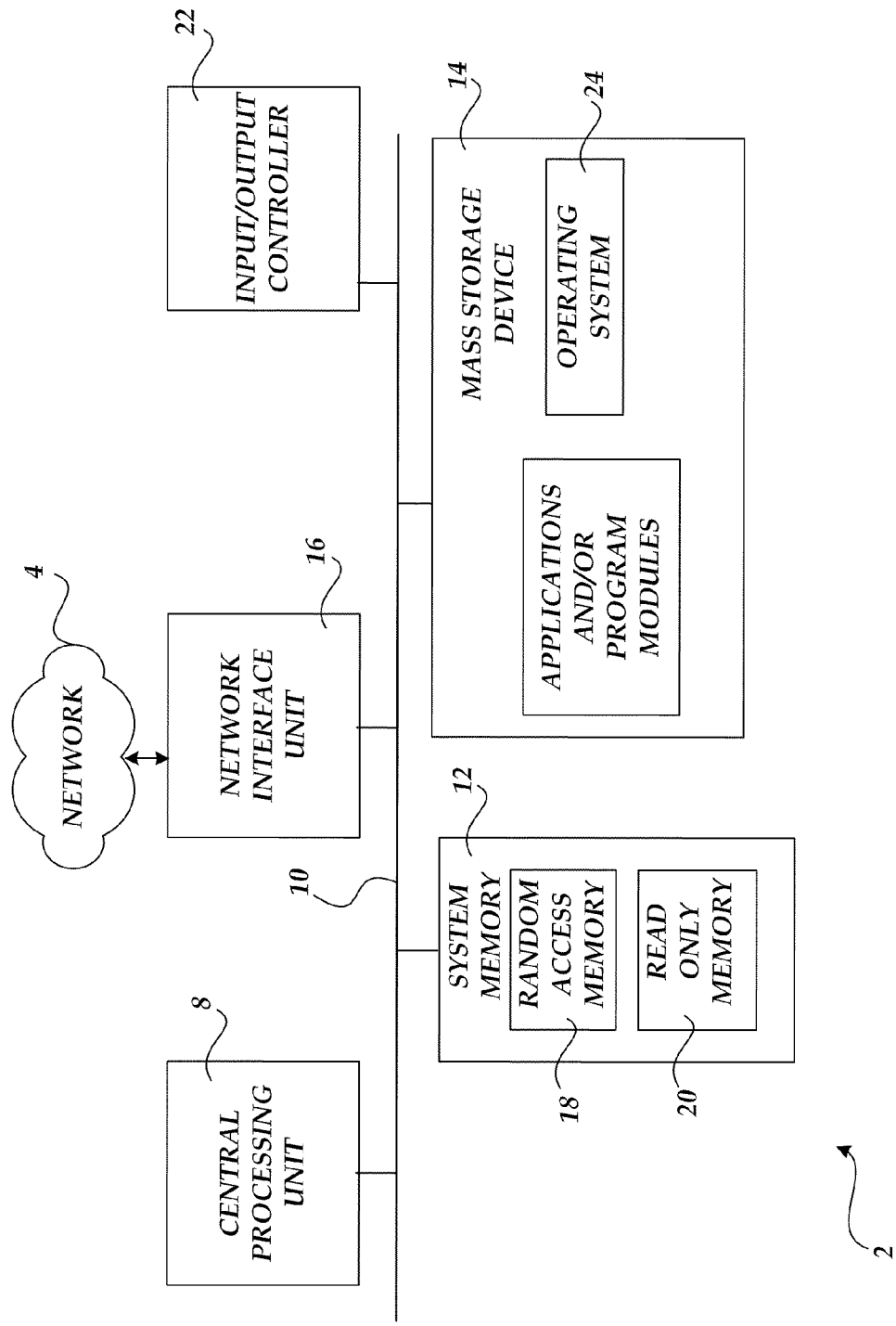
FIG. 9 is a block diagram illustrating an exemplary computing environment for implementation of various embodiments described herein.

Referring now to FIG. 9, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 9, an illustrative operating environment for embodiments of the invention will be described. As shown in FIG. 9, computer 2 comprises a general purpose desktop, laptop, handheld, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The computer 2 further includes a mass storage device 14 for storing an operating system 24, application programs, and other program modules.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of other devices, including a keyboard, mouse, etc. (not shown). Similarly, an input/output controller 22 may provide output to a display screen, a printer, or other type of output device.

As mentioned briefly above, a number of program modules and data files may be stored in the mass storage device 14 and RAM 18 of the computer 2, including an operating system 24 suitable for controlling the operation of a networked personal computer, such as the WINDOWS operating systems from MICROSOFT CORPORATION of Redmond, Wash. The mass storage device 14 and RAM 18 may also store one or more program modules. In particular, the mass storage device 14 and the RAM 18 may store application programs, such as word processing, spreadsheet, drawing, e-mail, and other applications and/or program modules, etc.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method comprising:
   monitoring pods of a computing environment, each pod including a number of pod resources;
   collecting performance data associated with the pod resources;
   calculating average values of the performance data;
   calculating smooth average values of the performance data;
   calculating residual capacity values based on differences of the average values and the smooth average values at coincident times over a given time period;
   providing capacity estimates for each pod to provide an automated prediction of time to capacity over the given time period based on a sum of an average of the smooth average values and a standard deviation of the residual capacity values divided by pre-determined capacity values, wherein the pre-determined capacity values correspond with predetermined capacity maximums for a processor consumption metric, a free disk space consumption metric, and a bandwidth consumption metric in part to provide the capacity estimates, wherein the providing the capacity estimates further includes calculating point-in-time capacity estimates for one or more of a hub transport role, a unified communications server role, and a client access server role for an associated pod; and
   storing the capacity estimates in computer readable storage.

2. The method of claim 1, further comprising collecting the performance data for each pod role including processor resource consumption amounts, free disk space, and disk input/output operations per second.

3. The method of claim 2, further comprising collecting the performance data including pages per second and available memory metrics.

4. The method of claim 1, further comprising producing a trend over a trending period using the capacity estimates.

5. The method of claim 4, further comprising predicting future capacity estimates using regression and worst case parameters.

6. The method of claim 1, further comprising calculating the residual capacity values using differences between the average values and the smooth average values at each point in time over the given time period.

7. The method of claim 1, further comprising providing the capacity estimates for each pod over the given time period based in part on the average of the smooth average values and a ninety fifth percentile measure of the standard deviation of the residual capacity values.

8. The method of claim 1, further comprising providing the capacity estimates for each pod of a datacenter over the given time period based in part on a peak value that corresponds to the sum of the average of the smooth average values and the standard deviation of the residual capacity values.

9. The method of claim 1, further comprising providing capacity trend data for a datacenter, pods, and pod roles.

10. The method of claim 9, further comprising providing future capacity data for the datacenter, pods, and pod roles.

11. The method of claim 9, further comprising providing optimistic and pessimistic capacity estimates.

12. A system comprising:
    a plurality of monitored systems, each monitored system including a number of system resources;
    a collector component to collect operational information associated with a select number of the monitored systems; and
    a capacity manager that uses collected operational information as part of an average capacity determination and a smooth average determination to provide residual capacity values based on differences of average values and smooth average values that are used in conjunction with an average of the smooth average determination to provide capacity estimates for an automated prediction of time to capacity for the select number of monitored systems, wherein the capacity manager provides the capacity estimates based on a sum of the average of the smooth average values and a standard deviation of the residual capacity values divided by pre-determined capacity values including calculating point-in-time capacity estimates for one or more of a hub transport role, a unified communications server role, and a client access server role for an associated pod, wherein the pre-determined capacity values correspond with predetermined capacity maximums associated with a processor consumption metric, a free disk space consumption metric, and a bandwidth consumption metric.

13. The system of claim 12, the capacity manager further to use a predictor to predict future capacity estimates based in part on a number of server roles including the hub transport role, the unified communications server role, and the client access server role.

14. The system of claim 13, the capacity manager further to use fitting operations to determine projected capacity information.

15. The system of claim 13, further comprising a trend generator to use the number of server roles and performance data corresponding to processing capacities, memory capacities, and a number of input-output operations to provide capacity trends.

16. A computer readable storage medium including operational instructions to perform estimations comprising:
    calculating average capacity values for a number of pods having respective pod resources;

calculating moving average capacity values for the pod resources of each pod;

calculating residuals for the pod resources of each pod based on differences of the average capacity values and the moving average capacity values; and providing capacity estimates for an automated prediction of time to capacity for the number of pods using resource capacity estimates associated with the resources of each pod based on a sum of an average of the moving average values and a standard deviation of residuals divided by pre-determined capacity values including calculating point-in-time capacity estimates for one or more of a hub transport role, a unified communications server role, and a client access server role for an associated pod, wherein the pre-determined capacity values correspond with pre-determined capacity maximums for a processor consumption metric, a free disk space consumption metric, and a bandwidth consumption metric.

17. The computer readable storage medium of claim 16 including operational instructions to perform estimations further comprising providing trend data for the number of pods.

18. The computer readable storage medium of claim 16 including the operational instructions to perform estimations further by generating capacity projection interfaces indicating projected capacity estimates.

19. The computer readable storage medium of claim 16 including operational instructions to perform estimations further by storing capacity estimates as part of trending future capacity estimates.

* * * * *